United States Patent
Zheng et al.

(10) Patent No.: US 6,701,026 B1
(45) Date of Patent: Mar. 2, 2004

(54) METHOD AND APPARATUS FOR CANCELLING LIGHTING VARIATIONS IN OBJECT RECOGNITION

(75) Inventors: Lei Zheng, Singapore (SG); Jian Kang Wu, Singapore (SG)

(73) Assignee: Kent Ridge Digital Labs, Singapore (SG)

(*) Notice: Subject to any disclaimer, the term of this patent is extended or adjusted under 35 U.S.C. 154(b) by 0 days.

(21) Appl. No.: 09/545,885

(22) Filed: Apr. 7, 2000

(30) Foreign Application Priority Data

Jan. 26, 2000 (SG) .......................... 200000452

(51) Int. Cl.[7] .............................. G06K 9/40
(52) U.S. Cl. ........................................ 382/274
(58) Field of Search ........................ 382/274, 167, 382/173, 254, 266, 275, 279, 260; 345/302, 473; 706/14; 358/450, 474

(56) References Cited

U.S. PATENT DOCUMENTS

| | | | |
|---|---|---|---|
| 4,523,229 A | | 6/1985 | Kanmoto |
| 4,648,051 A | * | 3/1987 | Wandell et al. ............. 382/162 |
| 4,695,884 A | | 9/1987 | Anastassiou et al. |
| 5,621,824 A | | 4/1997 | Ijiri et al. |
| 5,696,607 A | * | 12/1997 | Yamana et al. ............. 358/474 |
| 5,715,325 A | | 2/1998 | Bang et al. |
| 5,850,469 A | * | 12/1998 | Martin et al. ............... 382/154 |
| 5,912,992 A | | 6/1999 | Sawada et al. |
| 6,124,864 A | * | 9/2000 | Madden et al. ............. 345/473 |
| 6,232,965 B1 | * | 5/2001 | Scott et al. ................. 345/302 |
| 6,351,321 B1 | * | 2/2002 | McIntyre et al. ........... 358/450 |
| 6,532,454 B1 | * | 3/2003 | Werbos ....................... 706/14 |

OTHER PUBLICATIONS

Funt, B.V., Drew, M.S., and Brockington, M. "Recovering shading from color images", Proc. European Conference on Computer Vision (ECCV'92), pp. 124–132, Springer–Verlag, May 1992.

Daunt, D.G., and Zhao, D., "Mathematical Morphology and Its Application in Machine Vision", Visual Communications and Image Processing IV, SPIE vol. 1199, pp. 181–191, 1998.

Bajcsy, R., Lee, S.W., and Leonardis, A., "Color Image Segmentation with Detection of Highlights and Local Illumination Induced by Inter–Reflections", IEEE 10th ICPR'90, pp. 785–790, Atlantic City, NJ, 1990.

Sterburg, S. "Biomedical Image Processing", Computer, vol. 16, No. 1, pp. 22–34, 1983.

Fries, R. W., and Modestino, J.W., "Image Enhancement by Stochastic Homomorphic Filtering", IEEE. Trans. On ASSP, vol. 27, No. 6, pp. 625–637, 1979.

Russ, J. C., *The Image Processing Handbook*, 3rd Ed., Chapter 3: "Color Shading", Boca Raton, Florida: CRC Press, 1999.

* cited by examiner

Primary Examiner—Jayanti K. Patel
Assistant Examiner—Sheela Chawan
(74) Attorney, Agent, or Firm—Nath & Associates PLLC; Harold L. Novick

(57) ABSTRACT

A lighting normalisation method, apparatus and computer program product are disclosed. First, lighting parameters are estimated (110) optimally based on a shading model. After applying segmentation (120), each generated region is assigned are liability based on the stochastic model of that object. This reliability is used to distinguish (130) shadow from object detail. Regions are then further split and merged (140) according to these reliabilities. Finally, the lighting parameters of these regions are calculated and the object is reconstructed (150) to a normalised lighting condition. This technique can be used for an object recognition system, i.e., face recognition applications, as well as for image enhancement, image retrieval, machine vision and related regions.

24 Claims, 7 Drawing Sheets

FIG. 6A                                    FIG. 6B

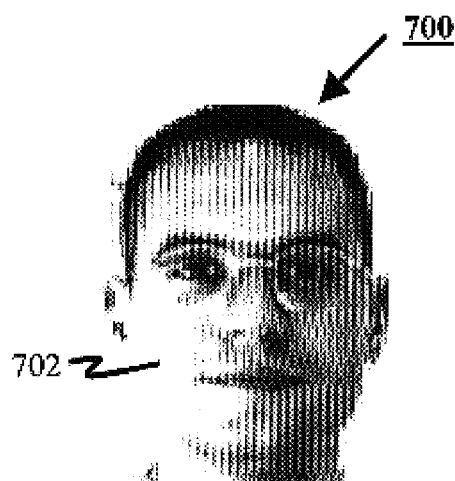
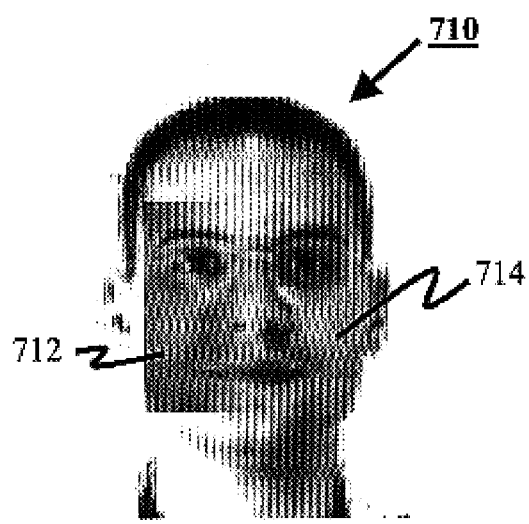
FIG. 7A    FIG. 7B
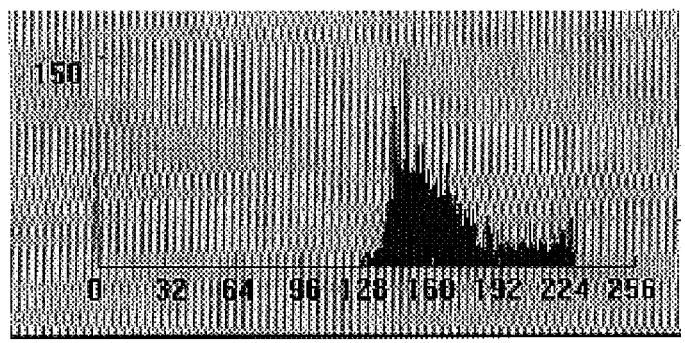
FIG. 7C
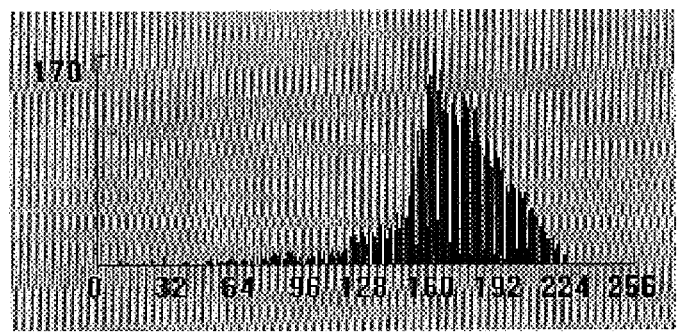
FIG. 7D

METHOD AND APPARATUS FOR CANCELLING LIGHTING VARIATIONS IN OBJECT RECOGNITION

FIELD OF THE INVENTION

The present invention relates generally to the field of digital image processing and more particularly to the processing of digital images to eliminate shadows and highlights while keeping object details.

BACKGROUND

A significant problem in digital image processing is distinguishing desired object details from shadows or shading effects. This problem arises from variations in illumination cast onto an object contained in the digital image. The inability to accurately distinguish variations in the illumination falling on an object and variations in the reflectance of light from the object leads to inaccuracies in, amongst other things face recognition applications, for example. While in certain controlled environments, variations in illumination can be tightly controlled in general this is not the case. A number of techniques have been described attempting to address this issue.

U.S. Pat. No. 5,715,325, issued to Bang et al. on Feb. 3, 1998, describes an apparatus and method for detecting a face in a video image using a gradient-based approach. In this technique, an image is normalised with a x-gradient in an attempt to produce a normalised image insensitive to illumination variations. However, this technique is disadvantageous, because this type of operation amplifies noise, while creating a bright line on the image, corresponding to abrupt changes of lighting conditions as shadow.

U.S. Pat. No. 4.695,884, issued to Anastassiou et al. on Sep. 22, 1987, describes a histogram-based approach for correction of shading effects in video images. In this technique, correction of video images for shading effects is attempted by generating a histogram of picture element (pel), gray-scale intensity values and calculating the median and the black and white extremes. However, this technique is disadvantageous, because object details are blurred when details have similar colour as the shadow. The shading effect is not eliminated.

The following three U.S. patents each describe hardware-based approaches. U.S. Pat. No. 5,912,992, issued to Sawada et al. on Jun. 15, 1999, describes a binary image forming device with shading correction means that interpolates shade densities determined using sample points. U.S. Pat. No. 4,523,229, issued to Kanmoto Yoshiaki on Jun. 11, 1985, describes a shading correction method and apparatus. U.S. Pat. No. 5,621,824, issued to Ijiri et al. on Apr. 15, 1997, describes a shading correction method and apparatus. The foregoing methods and apparatuses attempt to correct shading effects by finding a reference block, but are disadvantageous because it is difficult to find a reference block accurately. Further, most objects and lighting conditions are not uniform, that is to say, they can not be referenced by a single block.

Funt, B. V., Drew, M. S., and Brockington, M., "Recovering shading from color images," *Proc. European Conference on Computer Vision* (ECCV'92), pp. 124–132, Springer-Verlag, May 1992 describes a classical filter-based technique using filters to suppress shading effects. High-pass filters are employed when a shadow is supposed to have a bigger size than object, and vice versa. However, this technique is disadvantageous when complex and noisy objects are involved, since high-pass filters amplify noise while low-pass filters blur details. Furthermore, it is difficult to know the size of shadow a priori.

Daut, D. G., and Zhao, D., "Mathematical Morphology and Its Application in Machine Vision", *Visual Communications and Image Processing* IV, SPIE Vol. 1199, pp. 181–191, 1989; and Sterburg, S., "Biomedical Image Processing", *Computer*, Vol. 16, No. 1, pp. 22–34, 1983 both describe morphological-based processing. By using a non-linear transform, these techniques attempt to perform an enhancement of photos that contain wide illumination variation. However, these techniques are disadvantageous because, due to lack of priori knowledge about filter size, image details blur when trying to eliminate the shading effect.

Fries, R. W., and Modestino, J. W., "Image Enhancement by Stochastic Homomorphic Filtering", *IEEE. Trans. on ASSP*, Vol. 27, No. 6, pp. 625–637, 1979 describes the use of homomorphic filters in an attempt to enhance photos under various illuminations. However, this technique is disadvantageous in that it is again difficult to predefine a filter size. Consequently, image details tend to blur when trying to eliminate the shading effect.

Bajcsy, R., Lee, S. W., and Leonardis, A., "Color Image Segmentation with Detection of Highlights and Local Illumination Induced by Inter-Reflections", *IEEE* 10th *ICPR'90*, pp. 785–790, Atlantic City, N.J., 1990; and Russ, J. C., *The Image Processing Handbook*, $3^{rd}$ Ed., Chapter 3: "Color Shading", Boca Raton, Fla.: CRC Press, 1999 describe color-based approaches. Assuming that shading does not take effect on some spectrum (or some linear transforms of spectrums), these techniques attempt to enhance photos by mapping them to light-invariant spectrums. However, each of these techniques is disadvantageous for at least two reasons. Firstly, content details sometimes have a colour similar to that of shadows. If so, applying such algorithms blurs images and affects the accuracy of recognition. Secondly, such techniques can become unstable when the illumination is too dark or too bright. Thus, the techniques cannot manage either black scenes or highlights. These drawbacks become highly intolerable in face recognition systems, since face images are full of details as well as highlights (glass for instance) and dark regions (for example, hair and eyes).

Thus, a need clearly exists for an improved technique of processing digital images to distinguish object features from shadows in the digital images.

SUMMARY

In accordance with a first aspect of the invention, there is disclosed a method of cancelling lighting variations in a digital image of a specified class of objects. The method includes the steps of:

estimating lighting parameters and a reliability for each pixel of the digital image using a stochastic model of the specified object class;

segmenting the digital image into regions having different lighting parameters;

distinguishing object details in the digital image from shadows in the digital image;

splitting and merging regions containing object details into nearest regions;

estimating predetermined lighting-parameter characteristics for each split and merged region; and reconstructing the digital image based on the estimated lighting-parameter characteristics.

In accordance with a second aspect of the invention, there is disclosed an apparatus for cancelling lighting variations in a digital image of a specified class of objects. The apparatus including:

- a device for estimating lighting parameters and a reliability for each pixel of the digital image using a stochastic model of the specified object class;
- a device for segmenting the digital image into regions having different lighting parameters;
- a device for distinguishing object details in the digital image from shadows in the digital image;
- a device for splitting and merging regions containing object details into nearest regions;
- a device for estimating predetermined lighting-parameter characteristics for each split and merged region; and
- a device for reconstructing the digital image based on the estimated lighting-parameter characteristics.

In accordance with a third aspect of the invention, there is disclosed a computer program product having a computer usable medium having a computer readable program code module embodied therein for cancelling lighting variations in a digital image of a specified class of objects. The computer program product includes:

- a computer readable program code module for estimating lighting parameters and a reliability for each pixel of the digital image using a stochastic model of the specified object class;
- a computer readable program code module for segmenting the digital image into regions having different lighting parameters;
- a computer readable program code module for distinguishing object details in the digital image from shadows in the digital image;
- a computer readable program code module for splitting and merging regions containing object details into nearest regions;
- a computer readable program code module for estimating predetermined lighting-parameter characteristics for each split and merged region; and
- a computer readable program code module for reconstructing the digital image based on the estimated lighting-parameter characteristics.

BRIEF DESCRIPTION OF THE DRAWINGS

In the following description, embodiments of the invention are described with reference to the drawings, in which:

FIGS. 6A–6D shows highlight effects of an image of a person's face and associated histograms in accordance with the second embodiment of the invention;

FIGS. 7A–7D shows reconstruction of the image of FIG. 6A to eliminate the highlight effects in accordance with the second embodiment of the invention.

DETAILED DESCRIPTION

A method, an apparatus, and a computer program product for cancelling lighting variations in object recognition are described. In the following description, numerous details are set forth. It will be apparent to one skilled in the art, however, that the present invention may be practised without these specific details. In other instances, well-known features are not described in detail so as not to obscure the present invention.

The embodiments of the invention are directed to a model-based lighting normalisation method. Using a stochastic model, the method can distinguish image details from shadows. Processing begins with a shading model, and then segmentation is applied to generate object regions. Finally, an object is reconstructed in a normalised lighting condition. This technique has several important aspects:

1) Object model-based estimation of lighting parameters;
2) Reliability functions for each estimated lighting parameter;
3) Segmentation based on estimated parameters; and
4) Shadow regions are distinguished from detail regions.

By distinguishing shadows from object detail, the method according to the first embodiment significantly suppresses shading effects, while keeping most object details. Experiments have shown the method to be efficient in face recognition applications. The distance measure between images of different lighting condition reduces significantly after applying the method, and the accuracy of recognition applications improves.

In the following description, components of the system are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

1 First Embodiment

Figure 1:
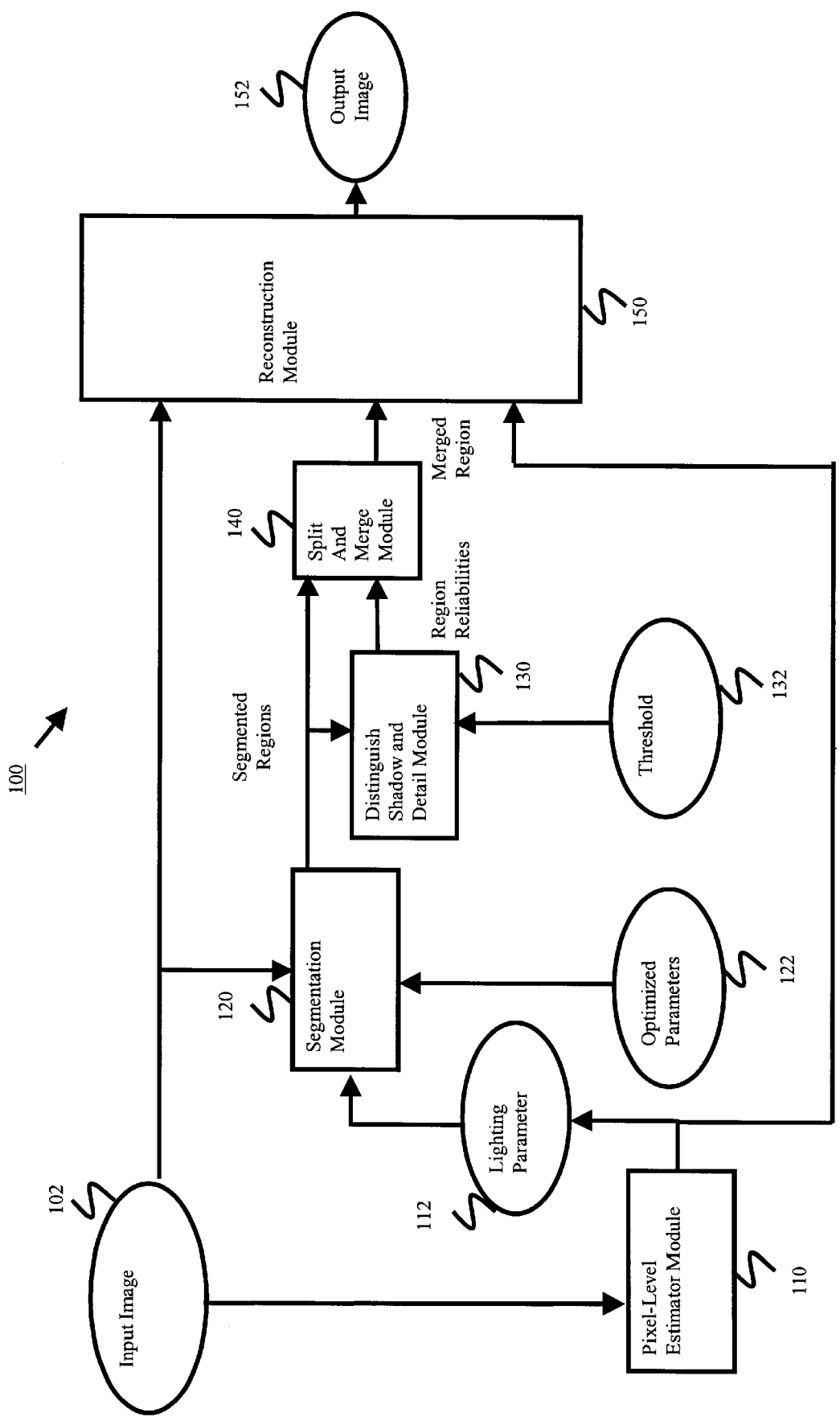
FIG. 1 is a block diagram illustrating a method and an apparatus for cancelling lighting variations in object recognition in accordance with a first embodiment of the invention.

FIG. 1 is a block diagram of the process and apparatus 100 for cancelling lighting variations in object recognition in accordance with the first embodiment of the invention. An input image 102 is provided to a reconstruction module 150, a segmentation module 120 and a pixel-level estimator 110. The pixel-level estimator module 110 produces at its output lighting parameters 112 that are provided to a segmentation module 120 and the reconstruction module 150. The segmentation module 120 also receives optimised parameters 122 as input and produces segmented regions as its output. The segmented regions produced by the segmentation module 120 are provided as input to a shadow and detail distinguishing module 130 and a split and merge module 140. The distinguishing module 130 also receives a threshold(s) 132 as input and produces region reliability measures at its output. The region reliabilities are also provided as input to the split and merge module 140. The split and merge module 140 provides merged regions as another input to the reconstruction module 150, which produces the output image 152.

The input image 102 is a digitized image obtained in a real environment. The method and apparatus of FIG. 1 seek to cancel lighting variations in the input image 102 and reconstruct the image to provide the output image 152 having a more desired environment. The real lighting conditions of the input image 102 may be different from an ideal environment in the following respects:

1) The real lighting may be brighter or darker than ideal lighting;
2) The real light may create shadows and highlights in the object in the image 102, while ideal lighting would not; and
3) The input image 102 may contain noise, which is not expected in an ideal environment.

The functionality of each module and the method as a whole of FIG. 1 are described in greater detail hereinafter.

2 Shading Model

A digitised image $\tilde{I}(m, n)$ obtained in a real environment may contain noise, and a camera may contribute gain and offset to the image as follows:

$$\tilde{I}(m, n) = F_{ill}(m, n) \cdot \text{Gain}(m, n) \cdot I(m, n) + \text{Offset}(m, n) + \text{Noise}(m, n)$$

$$= C_1(m, n) \cdot I(m, n) + C_2(m, n)$$

(1-1)

where (m,n) represents discrete spatial co-ordinates. $I(m, n)$ is the digitised object, which can be regarded as an object image obtained in an ideal lighting condition with an ideal camera. $C_1(m,n)$ and $C_2(m,n)$ are combinations of shading and gain, and offset and noise, respectively.

An estimation of $C_1(m,n)$ and $C_2(m,n)$ from the actual image $\tilde{I}(m,n)$ is required, and then original object image $I(m,n)$ can be reconstructed. Generally speaking, the Offset (m,n) can be assumed to be constant across the whole image, and Noise(m,n) represents Gaussian noise. Experiments suggest that the contribution of camera offset in relation good cameras can be neglected. That is to say, in most of applications, it can be assumed that:

$$\text{Offset}(m,n)=0 \qquad (1-2)$$

If so, $C_2(m,n)$ represents zero-mean Gaussian noise.

3 Model-based Lighting Normalisation

Recovering the image I (m,n) directly from Equation (1-2) is an ill-posed problem, even with assumption (1-2). However, expeirments show that lighting parameters often do not change frequently; instead, the lighting parameters remain constant inside local regions. So a more reliable estimation of lighting parameters can be acquired by assigning a constant $C_1$ for each region, instead of computing these parameters by pixel.

The problem has been divided into two parts:

1) Segmenting an input image into regions of different lighting parameters, and
2) Assigning lighting parameters for each segmented region. Since $C_2(m,n)$ is assumed to be Gaussian, a preferable way to segment the input image is to use fuzzy C-mean clustering. A lighting parameter for each pixel is estimated coarsely before clustering input data based on those parameters. The reliability of this estimation is also relevant to the following steps of FIG. 1. Therefore, a stochastic model of the specific object class is used.

As discussed hereinbefore, estimation of lighting parameters by pixel may not be reliable enough for segmentation. Thus, illumination information and geometrical information can be added to achieve better performance. Changes of illumination usually come not only from shading effects but also from detail occurrences. Importantly, shadows are to be distinguished from object detail. This is in contrast to conventional techniques where the object surface is assumed to vary slower than the shadow does. However, the foregoing assumption is not true when an object is rich in details. Consequently, conventional techniques blur details and negatively affect recognition results. In the embodiments of the invention, however, a probabilistic method is employed. By assigning a reliability measure to each region, shadow regions can be discerned from detail regions.

After detail regions are split and merged into shadow regions, parameters are assigned for these regions. This is done by combining lighting parameters 112 of each pixel in this region, weighted by its reliability.

Referring again to FIG. 1, the lighting parameters 112 are estimated pixel-by-pixel in module 110. The input image 102 is segmented by module 120 into regions of different illumination parts dependent upon the lighting parameters and optimization parameters 122. The optimization parameters 122 are weights that are described hereinafter in equation (2-3-1) denoted by A and B. The optimization parameters 122 can be used to opitmize the result of segmentation but are not indispensable for implementing this algorithm. That is, the optimized parameter module is an optional part of this algorithm. What the optimization parameters 122 represent depend on what segmentation method is used. In module 130, a probabilistic method and a predetermined threshold(s) 132 are employed to distinguish shadow and object detail in the segmented regions. Merged regions are formed in module 140 using the segmented regions and the corresponding region reliability. Finally, the object image $I(m,n)$ 152 is reconstructed by module 150 after splitting and merging the regions and assignment of a lighting parameter for each region.

3.1 Estimate the Stochastic Model

A stochastic model of a specified object class should be obtained before estimating lighting parameters of a real object image of that class. That is to say, the expectance and covariance of that class of objects are estimated. The training set includes shadowless images of those objects (for example, different face images under the same lighting condition). After object detection and geometrical normalisation, the interested object is extracted and mapped to similar size and orientation. Thus, an unbiased method can be used to estimate probabilistic parameters from this training set. Equations (2-1-1) and (2-1-2) are estimation equations used in this embodiment, however, other methods can be used without departing from the scope and sprit of the invention.

$$\tilde{I}(x, y) = E[I(x, y)] \quad (2\text{-}1\text{-}1)$$

$$= \frac{1}{J}\sum_{j=1}^{J} I_j(x, y)$$

$$\delta_I(x, y) = D[I(x, y)] \quad (2\text{-}1\text{-}2)$$

$$= \frac{1}{J}\sum_{j=1}^{J} I_j^2(x, y) - \tilde{I}^2(x, y)$$

Figure 2:
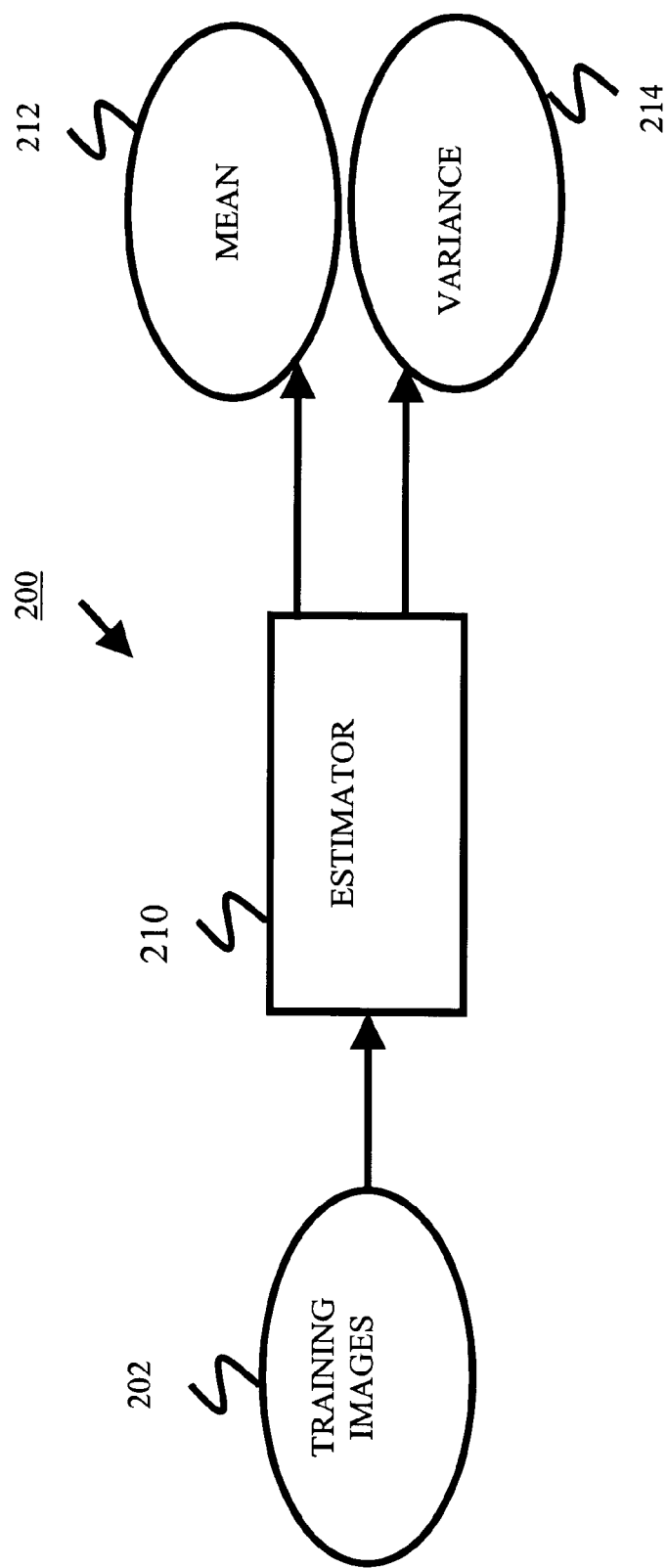
FIG. 2 is a block diagram of an estimator for a stochastic model in accordance with the first embodiment of the invention.

FIG. 2 is a block diagram of this training step 200. Training images 200 input to the estimator module 210 should be independent from each other and taken under similar lighting conditions. The estimator module 210 produces a mean value 212 and variance values 214 at its output.

3.2 Estimate Lighting Parameters by Pixel

To generate regions of different illumination using segmentation (preferably, fuzzy C-Mean clustering), knowledge is needed not only lighting parameters for each pixel, but also its reliability. Assuming that the noise $C_2(m,n)$ is Gaussian and the black balance technique works properly $C_2(m,n)$ is a zero-mean Gaussian noise. Accordingly $C_1(m,n)$ can be estimated simply by:

$$\tilde{C}_1(m,n) = \tilde{I}(m,n)/\tilde{I}(m,n) \equiv \bar{I}(m,n)/\tilde{I}(m,n) \quad (2\text{-}2\text{-}1)$$

$\tilde{I}(m,n)$ can be obtained from Equation (2-1-1). The reliability of estimated parameter $\tilde{C}_1(m,n)$ depends on the covariance of that pixel $\delta_1(m,n)$. A high covariance generally means low reliability of the estimated parameter. The reliability is defined as the division of two possibilities, represented by:

$$R_{c_1}(m, n) \equiv P(\tilde{I}(m, n)|C_1 = \tilde{C}_1)/P(\tilde{I}(m, n)|C_1 = C_1') = \quad (2\text{-}2\text{-}2)$$

$$\sqrt{\frac{c_1'^2 \delta_1^2(m, n) + \delta_n^2}{\tilde{c}_1^2 \delta_1^2(m, n) + \delta_n^2}}$$

$$\exp\left(\frac{(\tilde{I}(m, n) - C_1'\bar{I}(m, n))^2}{2(C_1'^2(m, n)\delta_1^2(m, n) + \delta_n^2)} - \frac{(\tilde{I}(m, n) - \tilde{C}_1\bar{I}(m, n))^2}{2(\tilde{C}_1^2(m, n)\delta_1^2(m, n) + \delta_n^2)}\right)$$

The parameter $\delta_n$ is the covariance of the noise, and $C_1'$ represents the overall lighting parameter, which is calculated as follows:

$$C_1' = \frac{\sum_{m,n} \tilde{I}(m, n)}{\sum_{m,n} \bar{I}(m, n)} \quad (2\text{-}2\text{-}3)$$

There are a number of techniques well known to those skilled in the art that can estimate $\delta_n$ from noisy images. Testing results suggest that $\delta_n$ is usually much smaller than $\delta_1$. In this case, Equations (2-2-2) to (2-2-4) can be simplified as follows:

$$R_{C_1}(m, n) = \quad (2\text{-}2\text{-}4)$$

$$\frac{C_1'}{\tilde{C}_1}\exp\left(\frac{(\tilde{I}(m, n) - C_1'\bar{I}(m, n))^2}{2C_1'^2(m, n)\delta_1^2(m, n)} - \frac{(\tilde{I}(m, n) - \tilde{C}_1\bar{I}(m, n))^2}{2\tilde{C}_1^2(m, n)\delta_1^2(m, n)}\right)$$

Noting that $\bar{I}(m,n)$ is digitised, the same noise has a greater effect on a darker pixel than on a brighter pixel when Equation (2-2-1) is applied. This is due to the instability of Equation (2-2-1) when $\bar{I}(m,n)$ is close to zero. In that case, $R_{C_1}(m,n)$ should be assigned a low value regardless of the result of Equation (2-2-2).

For convenience, the value of $R_{C_1}(m,n)$ is normalised to [0,1]. The normalised $R_C^N(m, n)$ is defined as:

$$R_C^N(m, n) = \frac{R_{C_1}(m, n) - \min_{m,n}(R_{C_1}(m, n))}{\max_{m,n}(R_{C_1}(m, n)) - \min_{m,n}(R_{C_1}(m, n))} \quad (2\text{-}2\text{-}5)$$

3.3 Segmentation

The segmentation module segments an input image into regions of different lighting parameters, reliabilities (input from the pixel level estimator) and intensities (input from the input image directly). To achieve a better result, it may (but not necessarily) use an optimisation process to adjust its weight parameters. Its output contains the segmentation information of the image (the geometrical map of segmented reunions).

Figure 3A:
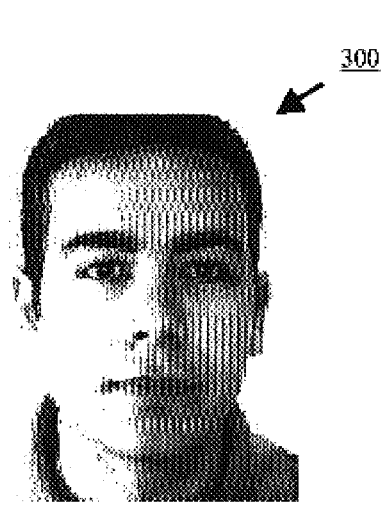
FIGS. 3A–3D are images of a person's face undergoing the process of the first embodiment of the invention.
Figure 3B:
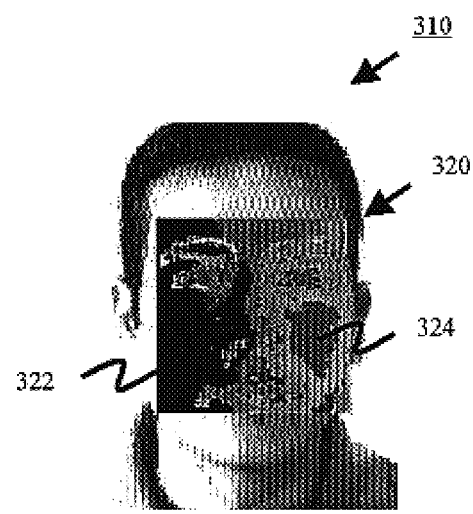

One possible method that can be used is used here is Fuzzy C-Mean segmentation. In this case, Equation (2-3-1) is used as a distance measure for Fuzzy C-Mean segmentation. An alternative might be histogram threshold based segmentation, which use a predefined or adaptively changing threshold to segment image into regions. Regions here represent different lighting conditions. FIG. 3A is an image 300 of a person's face that can be input as the input image 102 to the segmentation module 120 of FIG. 1. Notice that the right forehead and right nose have different lighting than the other side of the face. So they are divided into separate regions. However, the left eye is located at different region to that of the left face, which is not expected since their lighting conditions are the same. This is corrected in the next step. FIG. 3B illustrates the segmented image 310 obtained from image 300 where a region 320 indicates segmentation into roughly three groups represented by different colours on the right and left sides 322, 324 of the person's face in the image 310.

There exist a number of methods to segment an image into connected regions, such as Fuzzy C-Mean Clustering, Split and Merge, Texture-based Segmentation, and so on. Preferably Fuzzy C-Mean Clustering is used to obtain clusters of different illuminations from object image. Then, the regions are split and merged by Connect Component Analysis (CCA).

The distance function used for clustering is $$D_j(m,n) = AR_C^N(m,n)[\tilde{C}_1(m,n) - \overline{C}_j] + B(1 - R_C^N(m,n))\text{Dist}_j(m,n) + [\tilde{I}(m,n) - \bar{I}_j] \quad (2\text{-}3\text{-}1)$$

where $\overline{C}_j$ and $\bar{I}_j$ represent the centre value of $C_1(m,n)$ and $\tilde{I}(m,n)$ in the j-th cluster, A, B are two weight parameters and $\text{Dist}_j(m,n)$ is the shortest geometrical distance from pixel $(m,n)$ to the border of the j-th cluster. Weights A, B can be optimised by an optimisation process, such as Simulated Annealing (SA) or Genetic Annealing (GA).

A priori knowledge can applied here to obtain better results. For example, if shadows are known to not have a shape like a strip, strip-like regions can be merged into other regions. Improvements have been observed when such a assumption is applied in face recognition applications. After clustering, CCA is used to generate regions and give each region a label.

3.4 Discern Shadow From Detail

To discriminate shadow from object, reliabilities are assigned to regions. One implementation is to average point-wise reliability in each region, as follows:

$$R_j = \frac{1}{N_j} \sum_{(m,n) \text{belongs to the } j\text{-th region}} R_C^N(m, n) \quad (2\text{-}4\text{-}1)$$

In Equation, (2-4-1) $N_j$ is the number of pixels in the j-th region. Then a threshold is applied. A region is treated as object detail when its reliability is smaller than the threshold, otherwise it is treated as shadow. The module 130 of FIG. 1 receives a segmented image 310 and outputs reliabilities that the regions are shadow regions.

Figure 3C:
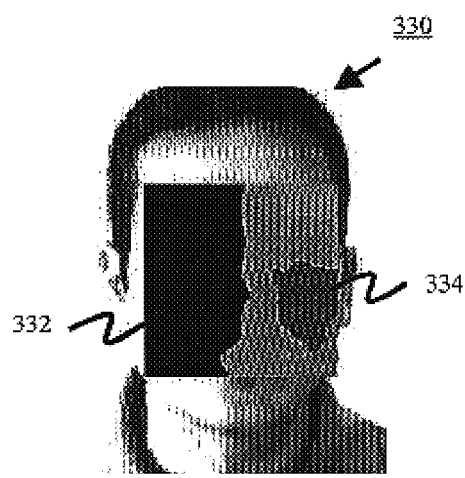

Regions that correspond to object details are split and merged into closest shadow regions. By "close" the shortest geometrical distance is meant. FIG. 3C illustrates an image 330 obtained from image 310 of FIG. 3B containing merged regions (indicated by black, gray and dark gray colours). After all regions have been processed, lighting parameters are assigned to each region as follows:

$$C_j = \frac{\sum_{j\text{-th region}} R_C^N(m, n) \tilde{C}_1(m, n)}{\sum_{j\text{-th region}} R_C^N(m, n)} \quad (2\text{-}4\text{-}2)$$

$C_j$ is the final estimation of $C_1(m,n)$ for all pixels in the j-th region. The split and merge module 140 of FIG. 1 splits the low reliability regions and merges them into near regions. Region information is obtained from the segmented regions and the reliabilities provided by the distinguishing module 130. Any of a number of split and merge technologies can be employed. After split and merge, a more reliable segmentation with regard to lighting conditions is obtained.

Noting that $C_2(m,n)$ is zero-mean Gaussian noise, the reconstruction function is:

$$\hat{I}(x, y) = \frac{\delta_I^2}{\delta_I^2 + \delta_n^2} \times \tilde{I}(m, n) / C_j + \frac{\delta_n^2}{\delta_I^2 + \delta_n^2} \bar{I}(m, n) \quad (2\text{-}4\text{-}3)$$

Figure 3D:
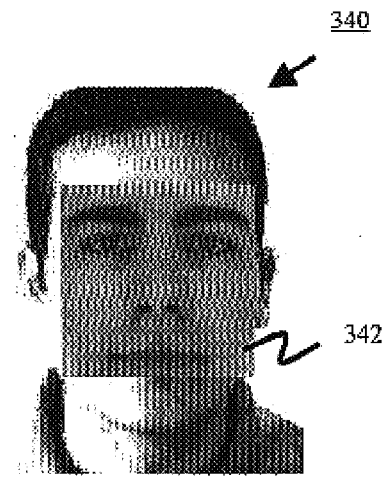

To reconstruct the image, the results of the split-and-merge module 140, the original image 102, and the pixel level estimation of lighting parameters 112 are used. Using Equation (2-4-3), module 150 can reconstruct an image from a noisy input. FIG. 3D illustrates the reconstructed image 340 with the region 342 being the part where variations in lighting have been suppressed. Alternatives of Equation (2-4-2) exist. Also, alternatives may be derived from the inverse of Equation (2-2-1), which reconstruct an image regardless of noise. Since lighting parameters inside a region may not be so uniform, a lighting parameter function can be estimated in these regions. Such a function is more complex but better performance can be obtained.

4 Second Embodiment

Figure 5:
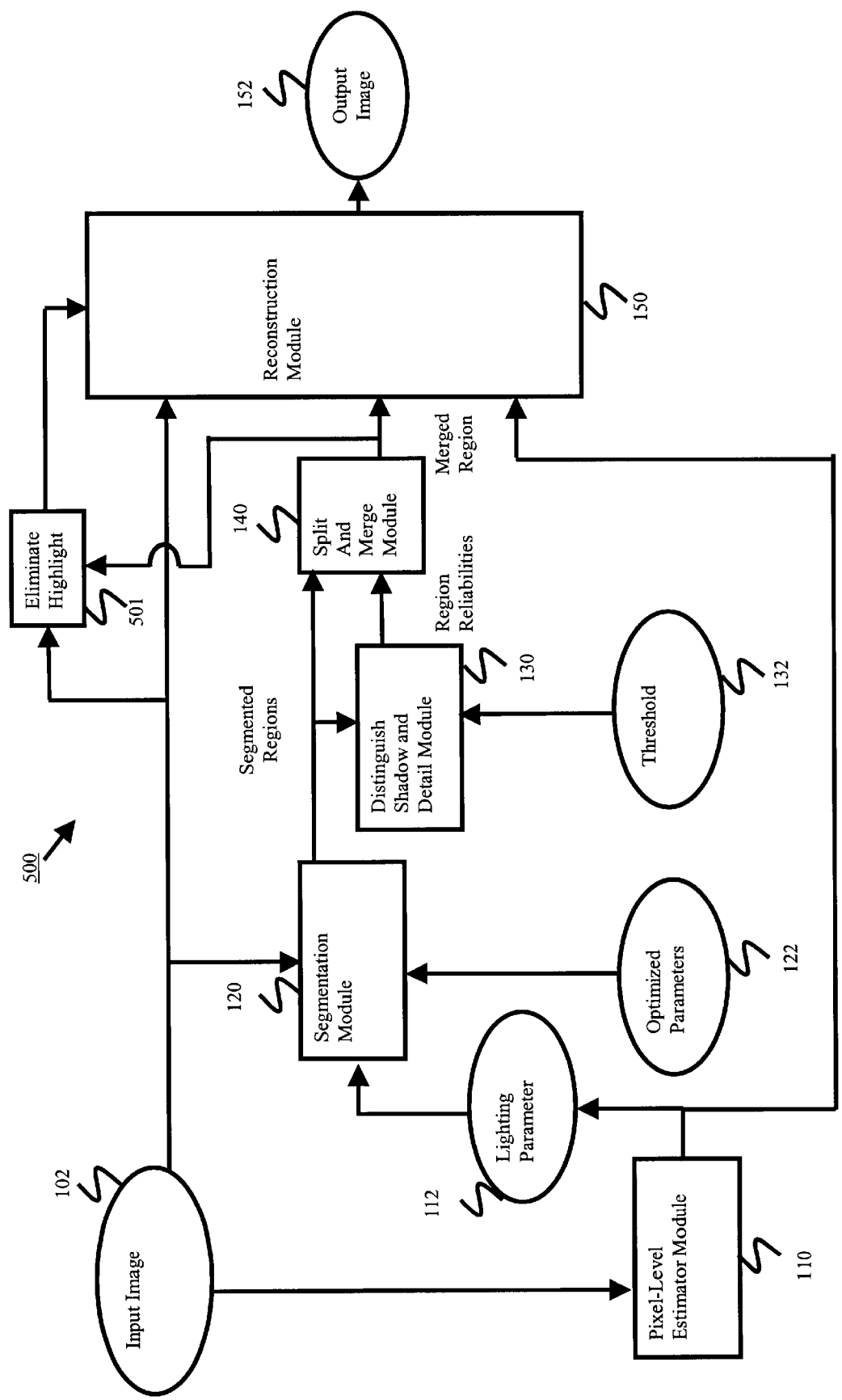
FIG. 5 is a block diagram illustrating a method and an apparatus for handling highlights in object recognition in accordance with a second embodiment of the invention.
Figure 6C:
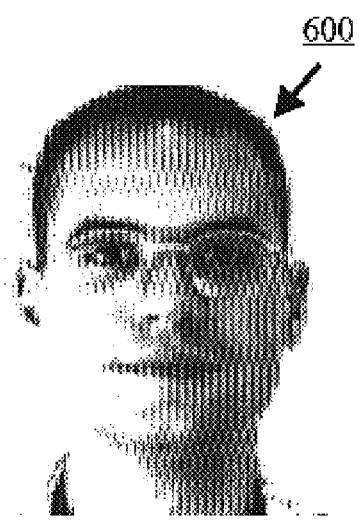
Figure 6C:
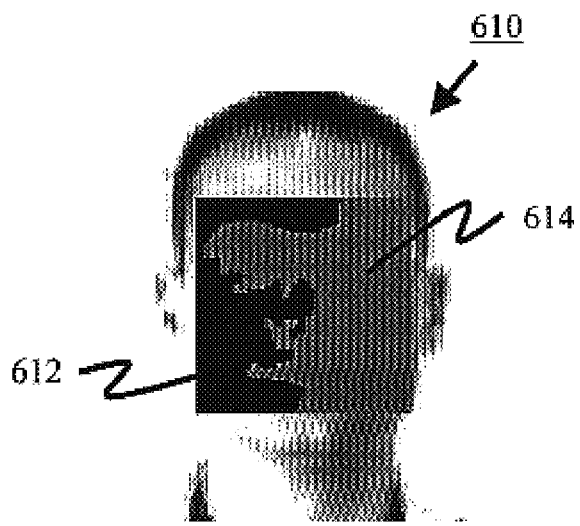
Figure 6C:
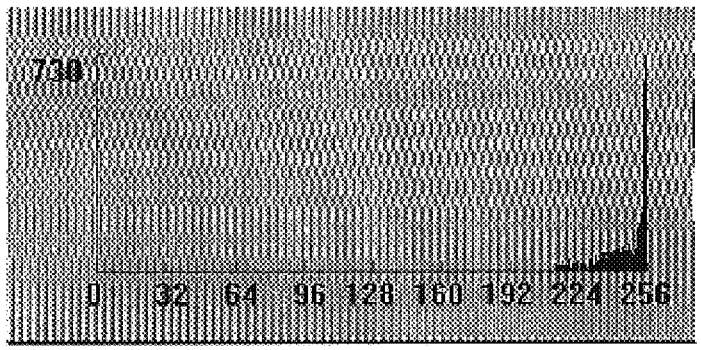
Figure 6D:
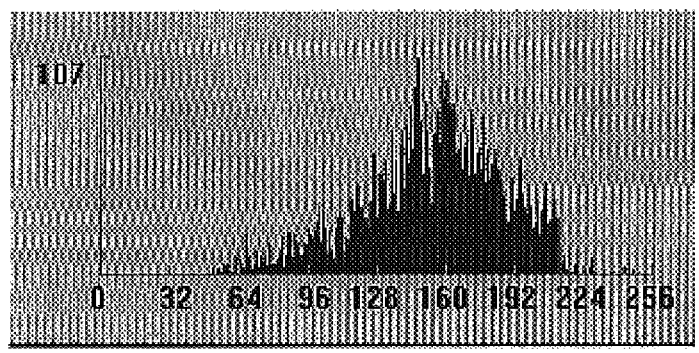

FIG. 5 is a block diagram illustrating a method and an apparatus 500 for handling highlights in object recognition in accordance with the second embodiment of the invention. For brevity, like elements described with reference to FIG. 1 have the same reference numbers in FIG. 5. Details of each such module or feature can be found hereinbefore in the description of FIG. 1. In this second embodiment, a highlight module 501 is added to handle highlight and obtain better performance under bright lighting conditions. The highlight module 501 receives inputs from the input image 102 and the merged regions provided by the split and merge module 140. The main purpose of the highlight module 501 is to eliminate highlight effects. Such highlight effects can be seen on the left side of a person's face 600 as illustrated in FIG. 6A. When the person's face 610 is mapped out using grey scale pixels, as shown in FIG. 6B, a highlight region 612 and a non-highlight region 614 are obtained. Histograms of the grey scale pixels for the highlight region 612 and the non-highlight region 614 are illustrated in FIG. 6C and FIG. 6D, respectively. The highlight module 501 removes highlights in input images. The main idea is to predict pixel values in highlight regions from other non-highlight regions and trained stochastic model. Thus, the pixel values in highlight regions are obtained by prediction (extrapolation or interpolation) using corresponding pixel values in non-highlight regions and trained mean image (denoted as $\bar{I}(m,n)$). Corresponding points of a specific pixel are defined as points that have correlation with that specific pixel. For example, for images that are symmetric, corresponding points can be points near symmetric positions of an original pixel in a non-highlight region, or points near the specific pixel in trained mean image.

Note that the prediction formula described hereinafter is only an example of possible methods. Alternatives can be practical without departing from the scope and spirit of the invention, and include other orders of linear prediction, non-linear prediction, Kalman filtering, and the like.

4.1 Handling Highlight

Within highlight regions, object illumination is raised above the maximum value that a camera can appropriately represent. Most cameras simply cut all these high values to a predefined scale. A judge or test function is defined as follows:

$$T(m, n) = \quad (3\text{-}5\text{-}1)$$

$$\begin{cases} 1 & \text{if pixel } (m, n) \text{ is a highlight point in high light region} \\ 0 & \text{else} \end{cases}$$

Highlight regions can be detected using a grey-scale histogram. If the portion of a highlight point exceeds a predefined threshold, this region is likely to be a highlight region. FIGS. 6C and 6D are examples of histograms of a highlight region. Since pixels in the highlight regions cannot be recovered using information of the local area alone, an additional prediction method is applied for handling highlight. For instance, if an object is symmetric in a certain extent, linear prediction may be used from symmetry point and the object's local region. If both sides of that object fall into highlight regions, a preferable way is to recover this region from mean image. An example of this is provided using the front view face image. First, a correlation matrix between symmetric points and their local regions is computed from a training set. Then a linear prediction method is applied. To introduce the linear prediction filter, the formula that defines a prediction filter in equation (3-5-2) is checked. There are two terms on the right. The first term is the part that corresponds to symmetry and the second corresponds to the average (mean) image.

$$I'(m,n) = \begin{cases} \sum_{i,j} a_{ij} \tilde{I}(-m+i, n+j) & \text{Case 1} \\ \sum_{i,j} b_{ij} \bar{I}(m+i, n+j) & \text{Case 2} \end{cases} \quad (3\text{-}5\text{-}2)$$

where I'(m,n) represents the prediction result, Ĩ(m,n) and Ī(m,n) are the input image and mean images, and $a_{i,j}$ and $b_{i,j}$ are their corresponding prediction weights.

Since prediction is only used on a highlight region, there are two cases in (3-5-2), denoted here by case 1 and 2. Case 1 represents that only one side of a symmetric pixel pair falls into the highlight region, while Case 2 represents that both sides are highlighted. Equation (3-5-2) can be taken as the formula of a filter, which allows $a_{i,j}$ and $b_{i,j}$ to be obtained in a simple way. In Case 1, small local regions are first found where all pairs of symmetric pixels are not highlighted, that is to say, both T(m,n) and T(-m,n) are equal to zero. Taking Ĩ(-m,n) as input and Ĩ(m,n) as output, $a_{i,j}$ can be estimated from these regions through any typical filter design method like Fourier transform algorithms. The same method can be applied to estimate $b_{i,j}$.

FIGS. 7A to 7D illustrate an example of reconstruction using 3rd-order linear prediction. An original image 700 having highlight effects 702, as illustrated in FIG. 7A, is processed to provide a reconstructed image 710 as illustrated in FIG. 7B. The reconstructed image 710, is generally even in terms of the grey scale range. Hence, the histograms of the highlight region 712 and the non-highlight region 714 of the reconstructed image 710 are generally similar as illustrated in FIG. 7C and FIG. 7D, respectively. Thus, information corresponding to the highlight region 712 has been recovered to provide the reconstructed image 710 shown in FIG. 7B by the highlight module 501, and this is why the histograms of the two different regions are generally similar.

Although the examples above deal with gray scale images, the embodiments of the invention are not limited to processing gray-scale images. The embodiments can be applied to color images and multi-band images by using the embodiments on every spectrum or band within these images, or using the embodiments on any transform field of original color images. A simple example is to apply the embodiments on RGB (Red-Green-Blue) channels separately and then reconstruct a color image from such channels.

Computer Implementation

Figure 4:
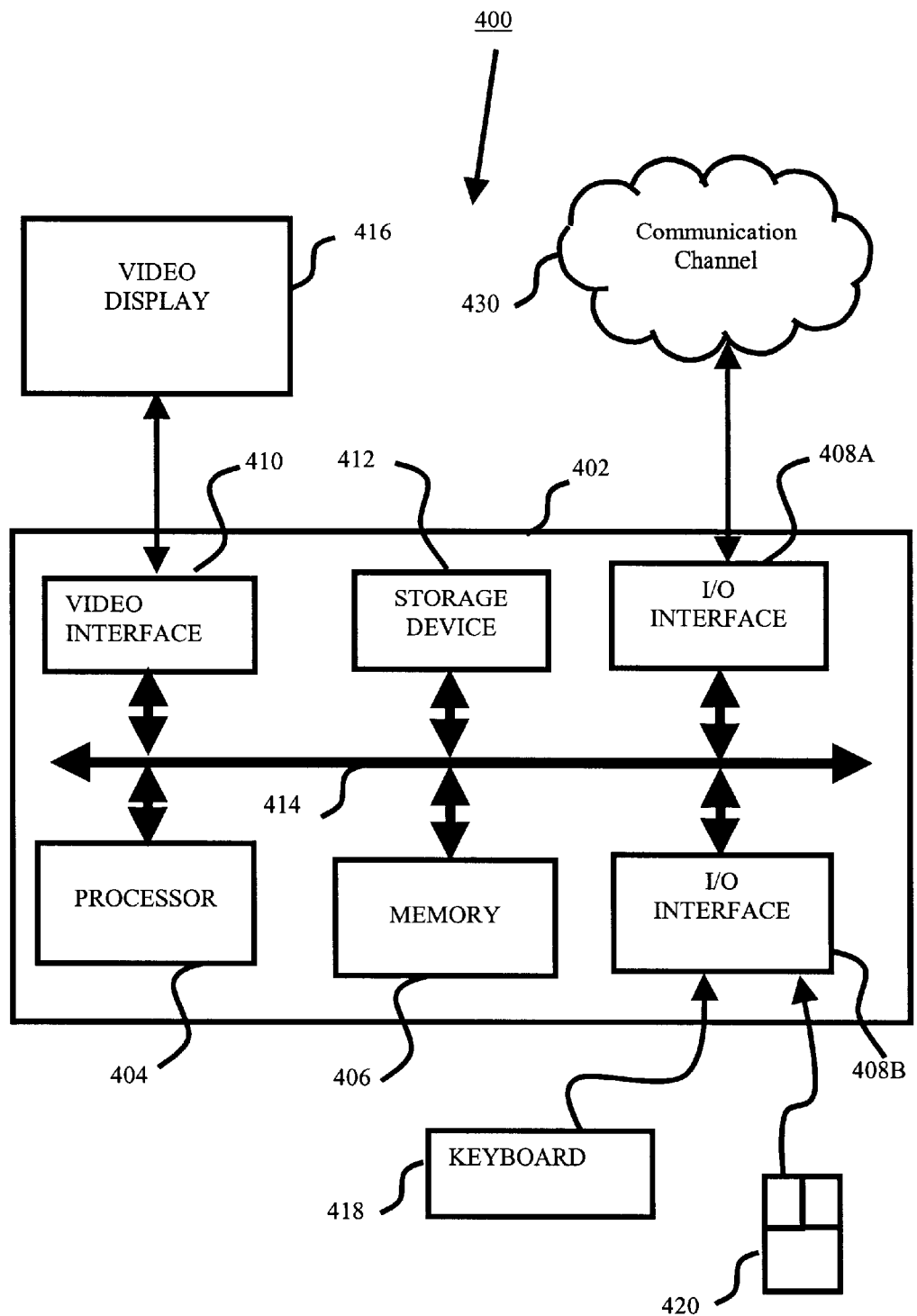
FIG. 4 is a block diagram of a general-purpose computer with which, embodiments of the invention can be practised.

The embodiments of the invention are preferably implemented using a computer, such as the general-purpose computer shown in FIG. 4. In particular, the processes of FIGS. 1 to 3, and 5–7 can be implemented as software, or a computer program, executing on the computer. The method or process steps for cancelling lighting variations are effected by instructions in the software that are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects an advantageous apparatus for an object recognition in accordance with the embodiments of the invention.

The computer system 400 consists of the computer 402, a video display 416, and input devices 418, 420. In addition, the computer system 400 can have any of a number of other output devices including line printers, laser printers, plotters, and other reproduction devices connected to the computer 402. The computer system 400 can be connected to one or more other computers via a communication interface 408A using an appropriate communication channel 430 such as a modem communications path, a computer network, or the like. The computer network may include a local area network (LAN), a wide area network (WAN), an Intranet, and/or the Internet.

The computer 402 itself consists of a central processing unit(s) (simply referred to as a processor hereinafter) 404, a memory 406 which may include random access memory (RAM) and read-only memory (ROM), input/output (IO) interfaces 408A and 408B, a video interface 410, and one or more storage devices generally represented by a block 412 in FIG. 4. The storage device(s) 412 can consist of one or more of the following: a floppy disc, a hard disc drive, a magneto-optical disc drive, CD-ROM, magnetic tape or any other of a number of non-volatile storage devices well known to those skilled in the art. Each of the components 404 to 412 is typically connected to one or more of the other devices via a bus 414 that in turn can consist of data, address, and control buses.

The video interface 410 is connected to the video display 416 and provides video signals from the computer 402 for display on the video display 416. User input to operate the computer 402 can be provided by one or more input devices 408B. For example, an operator can use the keyboard 418 and/or a pointing device such as the mouse 420 to provide input to the computer 402.

The system 400 is simply provided for illustrative purposes and other configurations can be employed without departing from the scope and spirit of the invention. Computers with which the embodiment can be practised include IBM-PC/ATs or compatibles, one of the Macintosh (TM) family of PCs, Sun Sparcstation (TM), a workstation or the like. The foregoing are merely exemplary of the types of computers with which the embodiments of the invention may be practised. Typically, the processes of the embodiments, described hereinafter, are resident as software or a program recorded on a hard disk drive (generally depicted as block 412 in FIG. 4) as the computer readable medium, and read and controlled using the processor 404. Intermediate storage of the program and pixel data and any data fetched from the network may be accomplished using the semiconductor memory 406, possibly in concert with the hard disk drive 412.

In some instances, the program may be supplied to the user encoded on a CD-ROM or a floppy disk (both generally depicted by block 412), or alternatively could be read by the user from the network via a modem device connected to the computer, for example. Still further, the software can also be loaded into the computer system 400 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practised without departing from the scope and spirit of the invention.

Thus, a method, apparatus and computer program product for cancelling lighting variations in object recognition are described. While only a small number of embodiments have been described, it will be apparent to those skilled in the art that changes and/or modifications can be made without departing from the scope and spirit of the invention in view of the disclosure herein.

What is claimed is:

1. A method of cancelling lighting variations in a digital image of a specified class of objects, said method including the steps of:
   estimating lighting parameters and reliability for each pixel of said digital image using a stochastic model of the specified object class;
   segmenting said digital image into regions having different lighting parameters;
   distinguishing object details in said digital image from shadows in said digital image;
   splitting and merging regions containing object details into nearest regions;
   estimating predetermined lighting-parameter characteristics for each split and merged region; and
   reconstructing said digital image based on said estimated lighting-parameter characteristics.

2. The method according to claim 1, further including the step of training said stochastic model of the specified object class.

3. The method according to claim 1, wherein said predetermined lighting-parameter characteristics are lighting parameters.

4. The method according to claim 1, wherein said predetermined lighting-parameter characteristics are lighting parameter functions.

5. The method according to claim 1, wherein said stochastic model is designated by or induced from a priori knowledge.

6. The method according to claim 1, wherein said steps of estimating lighting parameters use predefined blocks of predetermined size and shape.

7. The method according to claim 1, wherein said predefined blocks include lines having a length and orientation.

8. The method according to claim 1, further including the step of eliminating highlight effects from said digital image.

9. An apparatus for cancelling lighting variations in a digital image of a specified class of objects, said apparatus including:
   means for estimating lighting parameters and a reliability for each pixel of said digital image using a stochastic model of the specified object class;
   means for segmenting said digital image into regions having different lighting parameters;
   means for distinguishing object details in said digital image from shadows in said digital image;
   means for splitting and merging regions containing object details into nearest regions;
   means for estimating predetermined lighting-parameter characteristics for each split and merged region; and
   means for reconstructing said digital image based on said estimated lighting-parameter characteristics.

10. The apparatus according to claim 9, further including means for training said stochastic model of the specified object class.

11. The apparatus according to claim 9, wherein said predetermined lighting-parameter characteristics are lighting parameters.

12. The apparatus according to claim 9, wherein said predetermined lighting-parameter characteristics are lighting parameter functions.

13. The apparatus according to claim 9, wherein said stochastic model is designated by or induced from a priori knowledge.

14. The apparatus according to claim 9, wherein both means for estimating lighting parameters use predefined blocks of predetermined size and shape.

15. The apparatus according to claim 9, wherein said predefined blocks include lines having a length and orientation.

16. The apparatus according to claim 9, further including means for eliminating highlight effects from said digital image.

17. A computer program product having a computer usable medium having a computer readable program code means embodied therein for cancelling lighting variations in a digital image of a specified class of objects, said computer program product including:
   computer readable program code means for estimating lighting parameters and a reliability for each pixel of said digital image using a stochastic model of the specified object class;
   computer readable program code means for segmenting said digital image into regions having different lighting parameters;
   computer readable program code means for distinguishing object details in said digital image from shadows in said digital image;
   computer readable program code means for splitting and merging regions containing object details into nearest regions;
   computer readable program code means for estimating predetermined lighting-parameter characteristics for each split and merged region; and
   computer readable program code means for reconstructing said digital image based on said estimated lighting-parameter characteristics.

18. The computer program product according to claim 17, further including computer readable program code means for training said stochastic model of the specified object class.

19. The computer program product according to claim 17, wherein said predetermined lighting-parameter characteristics are lighting parameters.

20. The computer program product according to claim 17, wherein said predetermined lighting-parameter characteristics are lighting parameter functions.

21. The computer program product according to claim 17, wherein said stochastic model is designated by or induced from a priori knowledge.

22. The computer program product according to claim 17, wherein both computer readable program code means for estimating lighting parameters use predefined blocks of predetermined size and shape.

23. The computer program product according to claim 17, wherein said predefined blocks include lines having a length and orientation.

24. The computer program product according to claim 17, further including computer readable program code means for eliminating highlight effects from said digital image.

* * * * *